US005527569A

United States Patent [19]
Hobson et al.

[11] Patent Number: 5,527,569
[45] Date of Patent: Jun. 18, 1996

[54] CONDUCTIVE FILTER LAMINATE

[75] Inventors: Alex R. Hobson; David E. Mooney, both of Elkton, Md.; Stephen K. Stark, Wilmington, Del.

[73] Assignee: W. L. Gore & Associates, Inc., Newark, Del.

[21] Appl. No.: 294,233

[22] Filed: Aug. 22, 1994

[51] Int. Cl.$^6$ .......................... B01D 27/06; B01D 29/27; B01D 39/16; B01D 46/04; B32B 5/26
[52] U.S. Cl. .......................... 428/35.2; 55/360; 55/382; 55/523; 55/528; 210/243; 210/488; 210/493.5; 210/497.01; 210/505; 210/507; 428/35.3; 428/35.9; 428/36.1; 428/36.5; 428/36.91; 428/283; 428/285; 428/311.5; 428/316.6; 428/317.9; 428/422
[58] Field of Search .......................... 55/360, 382, 523, 55/528; 210/243, 488, 493.5, 497.01, 505, 507; 428/35.2, 35.3, 35.9, 36.1, 36.5, 36.91, 283, 422, 285, 311.5, 316.6, 317.9

[56] References Cited

U.S. PATENT DOCUMENTS

| | | |
|---|---|---|
| 2,893,105 | 7/1959 | Lauterbach . |
| 3,577,705 | 5/1971 | Sharlit . |
| 3,733,784 | 5/1973 | Anderson et al. . |
| 3,733,785 | 5/1973 | Gallaer . |
| 3,910,779 | 10/1975 | Penney . |
| 3,935,029 | 1/1976 | Baker et al. . |
| 3,966,435 | 6/1976 | Penney . |
| 3,979,189 | 9/1976 | Alskog . |
| 4,147,522 | 4/1979 | Gonas et al. . |
| 4,200,400 | 4/1980 | Laubach et al. . |
| 4,244,710 | 1/1981 | Burger . |
| 4,357,150 | 11/1982 | Masuda et al. . |
| 4,557,957 | 12/1985 | Manniso . |
| 4,715,870 | 12/1987 | Masuda et al. . |
| 4,720,400 | 1/1988 | Manniso . |
| 4,750,921 | 6/1988 | Sugita et al. . |
| 4,865,909 | 9/1989 | Manniso . |
| 4,878,930 | 11/1989 | Manniso et al. . |
| 4,904,283 | 2/1990 | Hovis et al. . |
| 4,916,110 | 4/1990 | Manniso . |
| 4,973,532 | 11/1990 | Taskier et al. . |
| 4,983,434 | 1/1991 | Sassa . |
| 5,021,831 | 6/1991 | Tonomoto . |
| 5,188,890 | 2/1993 | Ohashi et al. . |
| 5,213,882 | 5/1993 | Sassa et al. . |
| 5,229,200 | 7/1993 | Sassa et al. . |
| 5,246,797 | 9/1993 | Imhof et al. . |

FOREIGN PATENT DOCUMENTS

| | | |
|---|---|---|
| 0066414 | 8/1982 | European Pat. Off. . |
| 0123965 | 7/1984 | European Pat. Off. . |
| 0123966 | 7/1984 | European Pat. Off. . |
| 0391660 | 10/1990 | European Pat. Off. . |
| 0386975 | 12/1990 | European Pat. Off. . |
| 9312281 | 6/1993 | WIPO . |

OTHER PUBLICATIONS

Technical Bulletin: Gore–Tex® Microfiltration Products "Air Filtration Efficiency Testing"; W. L. Gore & Associates, Inc.; May 3, 1994.

*Primary Examiner*—James C. Cannon
*Attorney, Agent, or Firm*—David J. Johns

[57] ABSTRACT

The present invention is an improved electrically conductive filter media particularly suitable for use in applications where static electricity must be dissipated. The filter media of the present invention comprises a microporous filtration layer having electrically conductive particles embedded therein. When attached to support media, this structure provides exceptional filtration efficiency while assuring a consistent and evenly distributed electrical pathway to ground.

20 Claims, 2 Drawing Sheets

CONDUCTIVE FILTER LAMINATE

BACKGROUND OF THE INVENTION

1. Field of the Invention.

The present invention relates to filtration media, and, particularly, to antistatic, electrically conductive filtration material.

2. Description of Prior References.

Control of static electricity can be of great importance in many industrial settings where an uncontrolled electrostatic discharge (ESD) or spark can result in serious damage. For example, static discharges can bring about the destruction of integrated circuits during some stages of their manufacture. In explosive environments, such as in grain elevators, or in flammable environments, such as on oil drilling rigs, in refineries, and in solvent-based processes, a static discharge can be extremely dangerous and must be prevented in order to safeguard life and property.

Organic polymeric textile materials used in these settings can be the source of static discharges due to the normally insulative nature of the materials. Further, such material may have a high value of specific resistance, typically on the order of $10^{12}$ ohm-cm or higher, unless the materials are altered to prevent build up of electrical charges on their surfaces by permitting charges found on their surfaces to drain in a controlled manner. A particularly preferred filtration media is expanded PTFE, such as that disclosed in U.S. Pat. No. 3,953,566 to Gore. While this material supplies a very good filtration efficiency, it is electrically resistant and untreated will not dissipate static electricity.

To control static electrical charges found in textile materials, electrical conductivity of organic polymeric textile material may be increased through application of antistatic finishes to the textile material or through introduction of at least partially conductive fibers into the textile material. Other means for controlling static electric charges include external devices to carry electrical charges found on the textile material to ground (e.g., grounding straps or wire).

One method of discharging static charges is to apply an antistatic finish to organic polymeric textile materials. This may be performed either when the organic polymeric textile material is in fiber form or in fabric form. These finishes typically increase ionic conductivity of the surface on which they are applied thereby promoting static dissipation. However, these finishes are typically not as durable as the polymeric textile materials on which they are applied. Cleansing or merely using the organic polymeric textile material can remove these finishes from the fabric surface, resulting in a loss of the material's ability to dissipate static electric charges.

Another approach is to apply a coating of metals or of conductive carbon to the outside surface of fibers used in producing organic polymeric textile material. However, if the coating used is not as flexible as the fiber on which it is placed, flexing of the fiber may cause cracks in the coating that may interrupt or destroy the conductive pathway formed by the coating.

Still another strategy to drain off static charges is to produce textile materials incorporating conductive fibers into a matrix of nonwoven filtration media. Examples of conductive fibers include carbon fibers, metal fibers, or filled expanded polytetrafluoroethylene (PTFE) fibers, such as that disclosed in U.S. Pat. No. 5,229,200 to Sassa.

While the above materials function well under some applications, they do not always address all requirements for electrostatic dissipation in all applications. U.S. Pat. No. 5,229,200 to Sassa et al., employs a filter media comprised of a static dissipative nonwoven textile material (support layer) which is laminated to an electrically insulative porous polymeric membrane (filtration layer), especially an expanded polytetrafluoroethylene (ePTFE) membrane. This media can meet some of the requirements of high filtration efficiencies and static dissipation. However, the insulative porous polymeric membrane limits the ability of the filter media to conduct electrical charges, thus restricting this media's use in extremely spark-sensitive environments. Additionally, some industries have developed standards for filtration media that require a surface resistance of a minimum value. The insulating porous polymeric membrane used in existing laminated filter media will not pass many of these specifications due to the high resistivity of the membrane.

Accordingly, it is a purpose of the present invention to provide a conductive filtration media that has both a high filtration efficiency and effective static dissipation properties.

It is another purpose of the present invention to provide a conductive filtration media that has the high filtration efficiency of expanded PTFE while having sufficient electrical dissipation properties to allow use in demanding explosive environments.

These and other purposes of the present invention will become evident through review of the following specification.

SUMMARY OF THE INVENTION

The present invention provides a filter media that provides both a high filtration efficiency and electrical conductivity. To achieve these properties a filtration layer is preferably formed of expanded polytetrafluoroethylene (ePTFE) membrane filled with conductive particles and/or is coated on at least one side with a thin conductor. The electrically conductive filter layer can readily conduct static charges away to a ground while retaining excellent filtration qualities. In its basic form, a support layer is attached to the conductive filtration layer merely to provide structural integrity for the filter media.

The filter media can be made even more conductive by including a conductive support material (e.g., a conductive particle-filled woven or non-woven material). Particularly preferred, the support material is made conductive by depositing a conductive layer (e.g., a metal) directly on to at least one surface, such as by plating, sputtering, or vacuum depositing.

The filtration media of the present invention has extremely high filtration efficiencies while being electrically conductive. The expanded PTFE filter membrane not only can provide filtration efficiencies up to 99.999%, but also has a low coefficient of friction and low surface tension-permitting filtered particles to readily release from the surface of the filter media. Even better release properties can be produced through a variety of methods whereby electrical charges are induced through the filter media.

DESCRIPTION OF THE DRAWINGS

The operation of the present invention should become apparent from the following description when considered in conjunction with the accompanying drawings, in which.

DETAILED DESCRIPTION OF THE INVENTION

The present invention comprises an electrically conductive ("anti-static") filter media having both excellent filtration characteristics and effective conductive properties.

Figure 1:
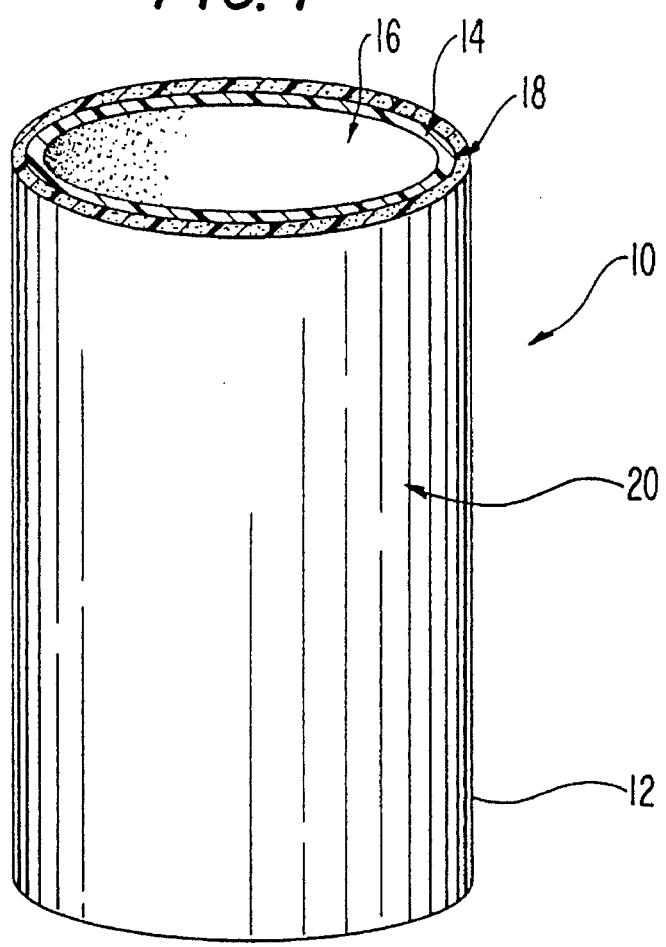
FIG. 1 is a front three-quarter elevation view of a filter bag incorporating filter media of the present invention.

As is shown in FIG. 1, the present invention comprises an electrically conductive filter media 10 in the form of a filter bag 12. The filter media 10 of the present invention comprises a support layer 14 providing an inside surface 16 and an electrically dissipative filtration layer 18 providing an outside surface 20. Arrangement of the support layer 14 and the filtration layer 18 may be reversed as applications dictate.

To achieve the unique properties of the present invention, the filtration layer 20 must incorporate effective and durable static dissipatory properties. Preferably, the electrically dissipative filtration layer 18 comprises a microporous membrane structure of expanded polytetrafluoroethylene (ePTFE). The ePTFE filter layer 18 can be made electrically conductive by filling the membrane with conductive particles and/or by coating at least one side of the membrane with a conductive coating, such as a metal. The ePTFE membrane is further comprised of polymeric nodes and interconnected fibrils. By forming a filter layer from such conductive material, many previously encountered problems have been reduced or eliminated. For example, by making the filter layer also the conductive layer, surface static charges and the like are very effectively dissipated. Further, the consolidation of the two functions (i.e., conductivity and filtration) into a single layer assures that separation or loss of electrical conductivity will not occur.

Preferably, the filter layer 18 of ePTFE is produced in the following manner:

A conductive particulate is added to an aqueous dispersion PTFE resin. The mixture is co-coagulated, i.e., the PTFE resin is coagulated in presence of the conductive particles by rapid shearing of the aqueous dispersion or through destabilization of the aqueous dispersion with salt, acid, polyethylene imine or the like. A coagulum of fine powder PTFE resin and conductive particulate is subsequently formed and dried into cakes. When dry, the cakes are carefully crumbled and lubricated with a mineral spirit and blended forming a consistent mixture.

The conductive particulate used in forming the conductive ePTFE membrane may comprise any suitable material, such as metals, metal compounds, graphites, or carbon blacks. Most preferred for this application is Ketjenblack Carbon because it has extremely high electrical conductivity and because the size and shape of the particles are conducive to the manufacturing process. By "particulate" is meant individual particles of any aspect ratio and thus includes flock, flakes, and powders.

Next, the mixture produced by either of the previously described methods is compressed into a billet and subsequently extruded through a die by a ram-type extruder forming a coherent extrudate. The extruded article thus formed is generally extruded in the form of a rod or tape. Also, the mineral spirits function as an extrusion lubricant for the compound.

The coherent extrudate is then compressed between a pair of calender rollers to reduce its thickness. Subsequently, the mineral spirits are removed from the calendered coherent extrudate by passing the coherent extrudate over a series of heated rollers. By maintaining the heated rollers at a temperature at or above the boiling point of the mineral spirits, the rollers volatilize the mineral spirits leaving a dry coherent calendered extrudate.

The dry coherent calendered extrudate is stretched using the method of expanding PTFE taught in U.S. Pat. No. 3,543,566 to Gore, incorporated herein by reference. The calendered sheet should then be subjected to heat and stretching in one or more dimensions to create an expanded PTFE matrix at a temperature between 35° and 327° C. Preferably, stretching occurs at a temperature of approximately 240° C. and at a ratio of 1.1 to 1 up to 200 to 1, or more. The preferred amount of expansion for use in the present invention is approximately 5:1 to 100:1. The rate of expansion may be between 2 to 10,000% per second, preferred for the present invention is a stretch rate of about 2 to 1000% per second. This produces an expanded porous polytetrafluoroethylene (ePTFE) matrix in continuous film form in which a conductive particulate filler is distributed.

The expanded polytetrafluoroethylene (ePTFE) should have about the following final properties: pore volume of about 10 to 99%, with preferred being about 75 to 95%; percentage of PTFE of 5 to 99%, with preferred being about 60 to 95%; and a thickness of 0.2 to 125 mils (5.0 to 3200 microns), with preferred being about 0.50 to 10.0 mil. (12.7 to 254 microns).

The conductive microporous filter membrane may be made conductive (or more conductive) through processes other than filling, such as by plating, sputtering, or vacuum depositing a metal or other conductor on the membrane. For example, the ePTFE may be metal plated as taught in U.S. Pat. No. 4,720,400 to Manniso. Plating the membrane makes it extremely conductive. Metal plated filter membranes can be used in specialty applications where the stress caused by flexing and abrasion of the application is moderate and where the electrical resistivity must be extremely low.

Figure 2:
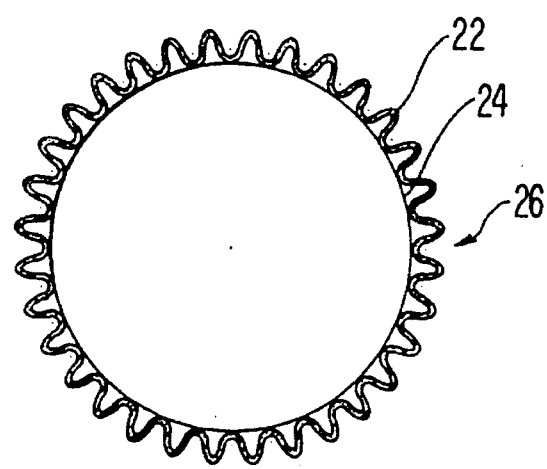
FIG. 2 is a cross-section view of a filter cartridge of the present invention.

FIG. 2 illustrates another embodiment of the filter media 22 of the present invention where the media 22 is pleated or otherwise convoluted and assembled onto a cage 24, such as a wire mesh. The pleated media 22 and the cage 24 form a filter cartridge 26 which can be used in applications requiring maximum filter surface area.

Figure 3:
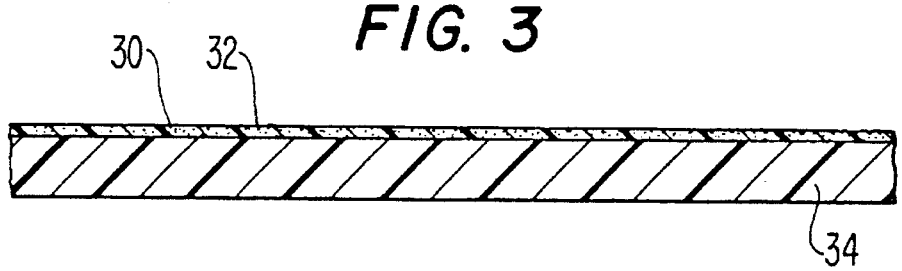
FIG. 3 is cross-section view of one embodiment of a filter sheet of the present invention, employing an electrically conductive filter layer and a support material.
Figure 4A:
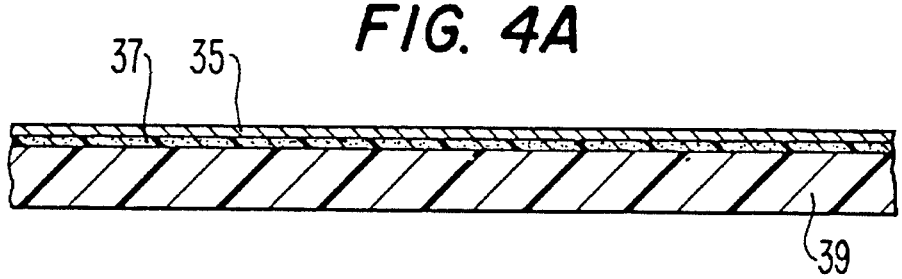
FIG. 4 is a cross-section view of another embodiment of a filter media of the present invention, employing a conductive particle filled membrane, support material, and a conductive coating formed between the filter layer and the support layer.
Figure 4B:
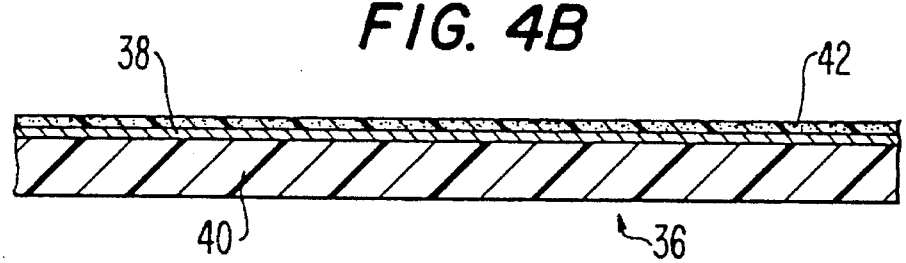

In its simplest form, a filter media of the present invention comprises a filter cloth 30 having a filtration layer 32 and a support layer 34 as depicted in a cross-sectional view in FIG. 3. The two layers are laminated or otherwise bonded together so as to prevent the filtration layer 32 from becoming distorted during use. Filtration layer 32 can be made conductive by filling the material and/or by coating at least one side of the filtration layer with a conductive material, especially a metal. FIG. 4A shows conductive layer 35 formed on filtration layer 37 which in turn is attached to support layer 39. Also, FIG. 4B shows another embodiment where conductive layer 38 is formed on filtration layer 42 and support layer 40 is attached to the conductive layer 38. In addition, conductive layers may be formed on both sides of the filtration layer.

The expanded conductive PTFE filtration membranes described above can be laminated to a support layer fabric to form the filter media of the present invention. The support layer can be formed of a fabric, which may be any woven or non-woven, felt, spunbonded, knitted, etc. The fabric may be made of any industrial fiber or plastic including polyester, polypropylene, acrylic, NOMEX® felt, etc. In addition, the filtration layer can be laminated to metal screens or wire meshes. When the filter media of the present invention is used in industrial filtration applications, where there is explosion potential, it is particularly preferred to provide an antistatic support layer. Anti-static fabrics include such fabric which include conductive materials or layers as that described in U.S. Pat. No. 5,213,882 to Sassa et al.

The ePTFE filtration layer-is attached to the support layer preferably by a lamination process. The two layers can be laminated by applying heat and pressure by passage through a nip of a heated roller and a elastomer silicone roller. Ranges for lamination of the ePTFE filter layer to the support layer will depend on the support layer material used. In general, the lamination conditions are: a temperature between 100° to 450° C., and preferably a temperature between 180° to 350° C.; a pressure between 2 to 100 psi (14 to 689 kPa), and preferably a pressure between 15 to 50 psi (103 to 345 kPa), and a fabric rate between 2 to 150 fpm (ft per min.) (0.6 to 46 m/rain) and preferably, a rate between 20 to 80 fpm (6 to 24 m/min).

Figure 5:
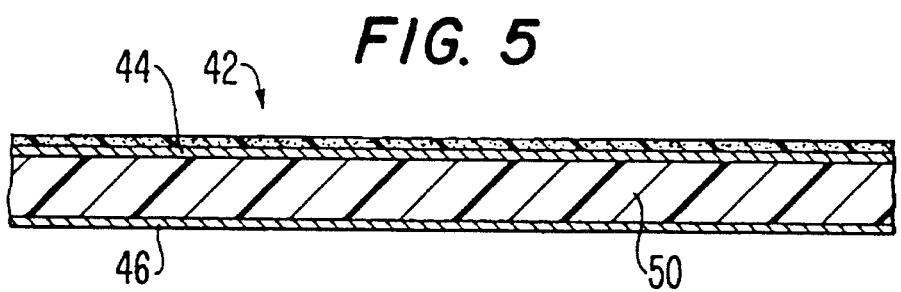
FIG. 5 is a cross-section view of still another embodiment of a filter media of the present invention, employing a membrane, a support material, a conductive coating deposited on both sides of the support material.
Figure 6:
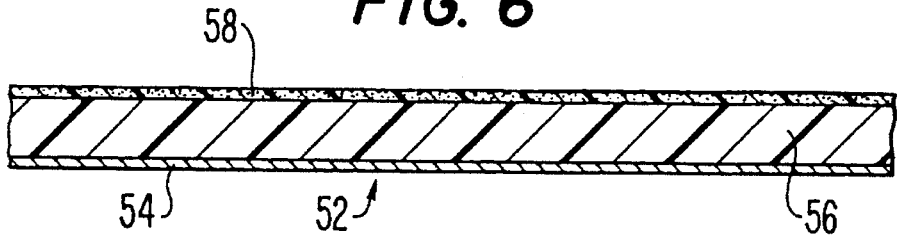
FIG. 6 is a cross-section view of yet another embodiment of the filter media of the present invention, employing a membrane, a support material, a conductive coating deposited on the side of the support material opposite the filter media.

Furthermore, the support fabrics can be made more conductive by vapor depositing a metal onto at least one side of the support layer surface as shown in FIGS. 4B, 5, and 6.

In the embodiment of the filter media 36 of the present invention shown in FIG. 4B, a coating of electrically conductive material 38 is formed on the support layer 40, between the support layer 40 and the filtration layer 42. The coating is preferably formed of a metal which may be selected from the group consisting of earth metals and metal compounds. These may include, without limitation, aluminum, nickel, cooper, vanadium, titanium, silver, palladium, platinum, tin, chromium, tin nitride, manganese, indium, potassium, permanganate, and tin oxide. Aluminum, nickel and copper are particularly preferred. Likewise, metals can be sputter coated, plated, or vacuum deposited onto the support layer. Alternately, the coating 38 may be directly deposited on to the filtration layer 42 before it is laminated to the support layer.

In FIG. 5, another embodiment of the filter media 42 of the present invention is shown where two conductive layers 44, 46 are applied to both sides of the support layer 50. The two conductive layer 44, 46 are formed as described above. The two conductive layers 44, 46 increase the conductivity of the filter media 42.

In FIG. 6, still another embodiment of the filter media 52 of the present invention is illustrated where a conductive layer 54 is formed on the support layer 56 on the opposite side from the filter layer 58.

In some filtration applications, a technique of voltage pulsing can be used to increase filter efficiency and remove built up filtered particles from the outside filtration layer. In voltage pulsing, particles being filtered are electrically charged to the same polarity as the charged filter prior to entering the baghouse or filtration zone. The charged filter media creates an electric field at the surface where the charged particles will have a tendency to be repelled. Thus, the repelled particles will tend not to penetrate the filter media and the filtration efficiency will increase. The use of electric fields in this manner also aids in the release of particles from the filter media by blocking particles before they can lodge in the support material. In addition, the electrical charging of the filter can be timed with air pulsing (blowing air backwards through the filter) of the media to aid releasing particles from the filter surface.

The ePTFE filter membrane of the present invention further aids in the removal of particles. The ePTFE filter membrane traps particles on its surface, thus preventing the particles from embedding in the support layer fabric. Also, since ePTFE has a very low surface energy, the particles do not readily stick to the surface which allows the filtered particles to be more easily "released" and pulsed away.

The following examples are presented to further explain the teachings of the instant invention and not to limit the scope of the invention. Various modifications and equivalents will readily suggest themselves to those of ordinary skill in the art without departing from the spirit and scope of the instant invention.

EXAMPLE 1

A layer of electrically conductive particle filled porous expanded polytetrafluoroethylene (ePTFE) membrane was produced in the following manner.

A 87 liter batch of material was made having 10% solids and 90% water by weight. Of the solids added, 7.5% consisted of ketjenblack carbon (10 micron nominal particle size) (from Akzo Chemical, Dobbsfery, N.Y.) and 92.5% consisted of PTFE from a fine powder PTFE dispersion (supplied by E. I. du Pont de Nemours and Co., Wilmington, Del.) that was approximately 29% solids by weight. The carbon was added to water and mixed for 25 minutes at 180 rpm (revolutions per min.) in a baffled mixing vessel. Next, the PTFE dispersion was added to the solution and mixed for approximately 1 minute at 300 rpms. The PTFE dispersion coagulated and entrapped the carbon particles. Subsequently, the coagulated mixture was filtered and placed in an oven at 150° C. for 24 hours. Afterwards, the mixture was placed in a freezer and allowed to cool for 24 hours. The cooled coagulated material was screened through a 0.25× 0.25 inch (6×6 mm) mesh. A hydrocarbon mineral sprit was added to the coagulant in a weight ratio of 0.67:1 respectively. The lubricated coagulated material was placed back in the freezer for at least 8 hours and then removed and left to sit at ambient conditions for approximately 24 hours. There after, the lubricated coagulated material was tumbled for approximately 15 minutes in order to thoroughly distribute the lubricant. The material was pelletized for approximately 25 minutes at approximately 900 psi (6205 kPa). The material was then extruded through a 4 inch (10.2 cm) barrel through a 6 inch (15.24 cm)×0.030 inch (0.8 mm) die at an average pressure of 1200 psi (powder per sq. inch) (8274 kPa). Later, the extrudate was calendered down to 0.012 inches (0.3 mm) by passing it through calendering rolls. The calendered extrudate was then dried by passing it over heated drums at approximately 200° C., at a rate of approximately 20 FPM (6.1 meters per minute). The dried calendered extrudate was longitudinally expanded approximately 2 to 1 at a temperature of 265° C. with a take up speed of approximately 8 ft per min (2.4 meters/min). The material was longitudinally stretched 5.25 to 1 at a temperature of 265° C. with at take up speed of 40 ft/min (12.2 meters/min). Next, the longitudinally expanded material was then transversely expanded approximately 8 to 1 with an output speed of approximately 60 FPM (18.3 meters per min) to form an ePTFE membrane. The resulting ePTFE membrane had an air permeability of 28 cfm (cubic feet per minute) per 1 sq. ft. of material at a pressure drop of 0.5 inch water gauge.

The support layer was formed of a spunbonded polyester fabric coated with a thin layer of aluminum approximately 350 angstroms thick by a vacuum deposition process by Dunmore Corporation of Newtown, Pa. The ePTFE membrane was placed onto the aluminum coated side of an anti-static spunbonded polyester fabric (AXTAR B2270-BKO) supplied by Toray Ind. Inc. of New York, N.Y. The two materials were laminated by applying heat and pressure by passage through a nip of a heated roller and a elastomer silicone roller. The roller temperature was approximately 250° C., pressure was 30 psi (207 kPa) and the fabric feed rate was 30 to 50 ft/min (9 to 15 m/min). The resulting fabric laminate had good bond strength between the ePTFE membrane and the nonwoven polyester. The air permeability for the final laminate of the ePTFE and the fabric support layer was approximately 10 cubic feet per minute (0.283 cubic meters) per 1 sq. ft. (0.0929 sq. m) of material at a 0.5 inch (12.7 mm) water gauge pressure drop.

This laminate material was tested for filtration efficiency using an efficiency test rig. In this test, the sample material was placed in one of two testing chambers. Atomized NaCl solution was used to produce the aerosol which challenged the sample media; the aerosol having a particle size range of 0.10 to 1.0 micro meter and a concentration of aerosol particles in the air of approximately 5500 particles/cc at a 0.25 to 0.35 micron particle size range. The size and number of aerosol particles was controlled as was the flow rate, room temperature, and humidity. The filtration retention efficiency was calculated from measured aerosol concentrations (as a function of particle size) before and after the filter sample using a LAS-X laser particle counter made by PMS. Using these particle measurements, the efficiency of the sample was calculated as a percentage for a given particle size range. Using this test at flow velocity approximately 10.5 fpm (3.2 m per min) and a 4 inch (102 mm) diameter sample size, the average efficiency of the laminate was 85.71 at the 0.25 to 0.35 micron meter particle size. As a comparison, the aluminum coated nonwoven polyester (i.e., the support layer alone) was tested in the same manner and had an efficiency of only 18.99 at the 0.25 to 0.35 micron meter particle size range. The laminate therefore had over a 400% increase in efficiency over the nonwoven polyester (support layer) alone.

Surface resistance was measured for the polyester nonwoven, the aluminum coated polyester, and the laminate consisting of the aluminum coated polyester and the carbon filled ePTFE filter layer membrane. The surface resistance was measured using a Hewlett Packard model 3478A multimeter, two rectangular surface electrodes 1"×¼" (25.4 mm×6.35 mm) mounted in an insulating frame with a 1" (25.4 mm) space between them perpendicular to the 1 inch (25.4 mm) dimension of the electrode, weight to provide 16 psi (110 kPa) on the electrodes, and an insulating clear plastic plate for a work station. Using this equipment, the surface resistance of the nonwoven polyester was greater than $10^{10}$ ohms/square, above the range of the equipment. The average surface resistance of the aluminum coated polyester was 12.2 ohms/square with one standard deviation of 1.6 ohms/square. The average surface resistance of the above-mentioned laminate was 3164 ohms/square with a standard deviation of 2921 ohms/square. There was a large variability in the laminate resistance due to the valuable contact resistance of the carbon filled ePTFE membrane and the electrodes. The laminate, however, had a surface resistance of approximately $10^4$ ohms/square, which is 8 orders of magnitude less than conventional filled ePTFE membrane laminates which are typically $10^{12}$ to $10^{14}$ ohms/square.

EXAMPLE 2

An electrically conductive particle filled ePTFE membrane made in accordance with the procedure described in Example 1 was laminated to an anti-static nonwoven polyester fabric ID # AXTAR B2270-BK0 made by Toray Industries Inc., New York, N.Y. In this case, the calendered extrudate was longitudinally expanded 2 to 1 at a temperature of 265° C. with a take up speed of 13.3 ft/min (4 meters/min) and then longitudinally expanded 3 to 1 at temperature of 265° C. with a take up speed of 40 ft/min (12.2 meters/min) to form the ePTFE filtration membrane.

The membrane produced was approximately 0.002 inches (51 microns) thick with an air permeability of 16 cfm (0.45 cubic meters) through 1 ft$^2$ (0.093 sq. m) of material at 0.5 inch (12.7 mm) water gauge pressure. The ePTFE membrane was tested for filtration efficiency before lamination using the same testing equipment as described in Example 1. The flow rate was again approximately 10.5 fpm (3.2 m/min) and the average efficiency was 99.99 at a 0.25 to 0.35 micron meter particle size with an average deviation of only 0.002%.

The filled ePTFE membrane was also tested for volumetric resistivity. The membrane was placed between two $^{11}/_{16}$ inch (17.5 mm) diameter copper electrodes and a weight was placed on top for the electrodes to provide 16 pound per square inch (71N) pressure. Using a Hewlett Packard 3478A multimeter, the through resistance was measured. Using the resistance, the thickness of the sample and the size of the electrodes, the volumetric resistivity was calculated. The average volumetric resistivity was 538 ohm-cm with one standard deviation of 400 ohm-cm. Here the standard deviation was high because of the high and variable contact resistance of the filled ePTFE membrane. As a comparison, unfilled ePTFE membranes have a volumetric resistivity of approximately $10^{12}$ ohm-cm which is at least 9 orders of magnitude higher than that of carbon filled ePTFE membrane of the present invention.

This carbon filled ePTFE membrane was laminated to the nonwoven polyester using sufficient heat, pressure, and dwell time to produce a good bond without excessive loss of permeability. The polyester was heated to the point at which it melt flowed and acted as an adhesive to the carbon filled ePTFE membrane. The final permeability of the laminate was 3.5 cfm (0.1 cubic meter/min) through 1 ft$^2$ (0.093 sq. m.) of media at 0.5" (12.7 mm) water gauge pressure drop.

The laminate fabric was then tested for filtration efficiency in a simulated industrial filtration application test. The laminate was cut, clamped and sealed into a channel measuring 12×12 inch (0.3×0.3 m). The laminate was challenged with AC FINE test dust from AC Rochester Division of General Motors, Wichita Falls, Tex., which has a well characterized particle size distribution. This dust is very representative of dust that would be filtered in many industrial filtration applications. The laminate was placed with the carbon filled ePTFE side facing the inlet of the test chamber that was loaded with dust at approximately 2.0 grains per cubic foot of air. Flow rate was set and controlled at 6–7 fpm (1.8–2.4 m/min). The filter was "backpulsed" (i.e., subjected to a burst of high pressure air from the downstream side of the filter) every 10 seconds with a pulse of air at 50 psi (345 kPa) for 0.1 seconds. This pulsing is used in many industrial applications to remove the dust and particles from the surface of the filter. This pulsing knocks off built up particles on the outside of the filter, thereby preventing the pressure drop across the filter from increasing too much. The test was run for 168 minutes or 1008 pulses. The downstream air was passed through a Gelman Science Type AlE fiberglass filter in order to collect any dust that may have penetrated through the filter laminate being tested. The fiberglass filter was weighed before and after the test in order to determine the mass of dust that penetrated through the filter laminate being tested. In addition, the dust inside the collection chamber on the upstream side of the filter was collected and weight as well as the dust remaining on the filter. Using the mass of the dust captured upstream of the filter laminate and the mass of the dust on the downstream fiberglass filter, the efficiency of the filter was calculated. The efficiency of the filter 99.99+%.

In addition, the filter was analyzed after the test to determine if the carbon filled ePTFE membrane was damaged during the testing. The filter had no appreciable damage, pin holes, or delaminations in any areas. The filter had excellent cake release indicated by the only 5.0% weight pick up of the filter laminate itself. The carbon filled ePTFE membrane prevented the dust from becoming trapped in the nonwoven polyester fabric, and the dust easily released from the non-stick surface of the membrane.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An electrically conductive filter media comprising
an electrically dissipative filtration layer having a microporous membrane structure of extended polytetrafluoroethylene;
a support layer attached to the filtration layer;
wherein the microporous structure includes electrically conductive particles embedded within the microporous membrane structure of the expanded polytetrafluoroethylene filter layer, the electrically conductive particles providing an evenly distributed electric pathway throughout the filtration layer to dissipate static charges from the filter media.

2. The filter media of claim 1 wherein the microporous membrane structure comprises expanded polytetrafluoroethylene including a microporous structure of polymeric nodes interconnected by fibrils.

3. The filter media of claim 2 that wherein the filtration layer includes electrically conductive particles of carbon.

4. The filter media of claim 1 that further comprises
a coating of electrically conductive material deposited on at least one side of the support layer, the coating assisting in the dissipation of static charges from the filter media.

5. The filter media of claim 4 wherein the coating comprises a thin coating of metal attached to the support layer.

6. The filter media of claim 1 wherein
a coating of electrically conductive material deposited on at least one side of the filtration layer, the coating assisting in the dissipation of static charges from the filter media.

7. The filter media of claim 6 wherein the coating comprises a thin coating of metal attached to the filtration layer.

8. The filter media of claim 1 wherein the support layer includes electrically conductive particles embedded therein, the electrically conductive particles assisting in the dissipation of static charges from the filter media.

9. The filter media as described in claim 1 in the form of a filter cloth.

10. The filter media as described in claim 1 in the form of a filter bag.

11. The filter media as described in claim 1 in the form of a filter cartridge.

12. A method for producing an electrically conductive filter media comprising
providing an electrically dissipative filtration layer having a microporous membrane structure of expanded polytetrafluoroethylene
having conductive particles embedded within the microporous membrane structure of the expanded polytetrafluoroethylene filter layer to dissipate static charges via an evenly distributed electrical pathway through the filtration layer;
attaching a support layer to the filtration layer mounting the filtration layer on to a filtration apparatus, the filtration apparatus including an electrical connection to conduct static charges from the filtration layer to ground; and
dissipating electrical charges evenly from the filtration layer during use via the electric pathway through the filtration layer.

13. The method of claim 12 that further comprises forming a coating of electrically conductive material on the support layer.

14. The method of claim 13 that further comprises
providing an electrically conductive coating comprising a metal; and
vacuum depositing the electrically conductive coating onto the support layer.

15. The method of claim 13 further comprises
providing an electrically conductive coating comprising a metal; and
sputter coating the electrically conductive coating onto the support layer.

16. The method of claim 13 that further comprises
providing an electrically conductive coating comprising a metal; and
plating the electrically conductive coating onto the support layer.

17. The method of claim 12 that further comprises
filling the support layer with electrically conductive particles so as to aid in the dissipation of static charges from the filtration layer.

18. The method of claim 12 that further comprises forming the filter media into a filter cloth.

19. The method of claim 12 that further comprises forming the filter media into a filter bag.

20. The method of claim 12 that further comprises forming the filter media into a filter cartridge.

* * * * *

UNITED STATES PATENT AND TRADEMARK OFFICE
CERTIFICATE OF CORRECTION

PATENT NO. : 5,527,569
DATED : June 18, 1996
INVENTOR(S) : Hobson et al

It is certified that error appears in the above-identified patent and that said Letters Patent is hereby corrected as shown below:

Col. 2, line 37: change "Polytetrafiuoroethylene" to --Polytetrafluoroethylene--.
Col. 5, line 26: change "layer" to --layer is--.
Col. 5, line 37: change "m/rain" to --m/min--.
Col. 5, line 50: change "cooper" to --copper--.
Col. 6, line 53: change "sprit" to --spirit--.
Col. 6, line 64: change "powder" to --pounds--.
Col. 9, line 16: change "AIE" to --A/E--.
Col. 9, line 45: change "extended" to --expanded--.
Col. 9, line 56-57: change "polytetrafiuoroethylene" to --polytetrafluoroethylene--.
Col. 10, lines 21-22: change "polytetrafiuoroethylene" to --polytetrafluoroethylene--.

Signed and Sealed this

Thirty-first Day of March, 1998

Attest:

BRUCE LEHMAN

*Attesting Officer*　　*Commissioner of Patents and Trademarks*